(12) United States Patent
Berselli

(10) Patent No.: US 12,019,033 B2
(45) Date of Patent: Jun. 25, 2024

(54) OPTICAL INSPECTION MACHINE FOR THE QUALITY CONTROL OF PARTS

(71) Applicant: DOSS VISUAL SOLUTION S.R.L., Bergamo (IT)

(72) Inventor: Hemiliano Berselli, Bergamo (IT)

(73) Assignee: DOSS VISUAL SOLUTION S.R.L., Bergamo (IT)

( * ) Notice: Subject to any disclaimer, the term of this patent is extended or adjusted under 35 U.S.C. 154(b) by 258 days.

(21) Appl. No.: 17/602,045

(22) PCT Filed: Apr. 7, 2020

(86) PCT No.: PCT/IB2020/053304
§ 371 (c)(1),
(2) Date: Oct. 7, 2021

(87) PCT Pub. No.: WO2020/208517
PCT Pub. Date: Oct. 15, 2020

(65) Prior Publication Data
US 2022/0178850 A1 Jun. 9, 2022

(30) Foreign Application Priority Data
Apr. 10, 2019 (IT) .................. 102019000005544

(51) Int. Cl.
*G01N 21/95* (2006.01)
*G01N 21/952* (2006.01)

(52) U.S. Cl.
CPC ....... *G01N 21/9515* (2013.01); *G01N 21/952* (2013.01)

(58) Field of Classification Search
CPC .................. G01N 21/9515; G01N 21/952
See application file for complete search history.

(56) References Cited

U.S. PATENT DOCUMENTS

2013/0208105 A1 8/2013 Schmidt et al.
2022/0178839 A1* 6/2022 Berselli ............... H04N 23/695

FOREIGN PATENT DOCUMENTS

| CN | 206557127 U | | 10/2017 |
| CN | 107664642 A | | 2/2018 |
| CN | 109975318 A | * | 7/2019 |
| EP | 2428794 A1 | | 3/2012 |
| EP | 3364174 A1 | | 8/2018 |
| TW | 201710671 A | | 3/2017 |

* cited by examiner

*Primary Examiner* — Peter B Kim
(74) *Attorney, Agent, or Firm* — ArentFox Schiff LLP; Michael Fainberg

(57) ABSTRACT

An optical inspection machine for the quality control of parts, in particular gaskets, comprises a rotary table on which the parts to be inspected are positioned and, above said rotary table, a peripheral viewing unit suitable for inspecting the outer and/or inner side surfaces of a part. The unit comprises a plurality of downward-facing video cameras and, beneath each video camera, at least one angled mirror suitable for reflecting the image of a portion of the outer and/or inner side surface of the part to be inspected.

12 Claims, 5 Drawing Sheets

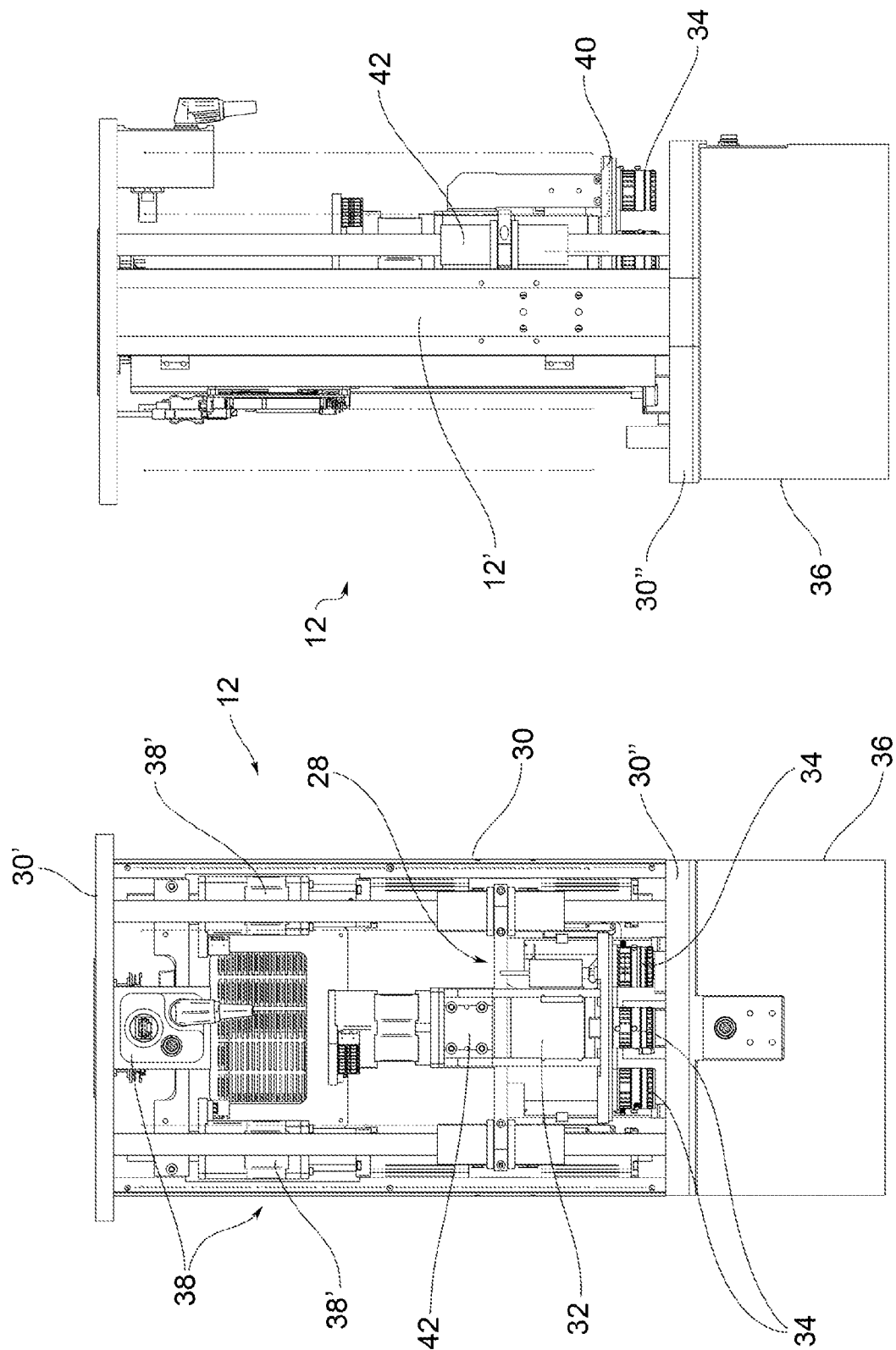

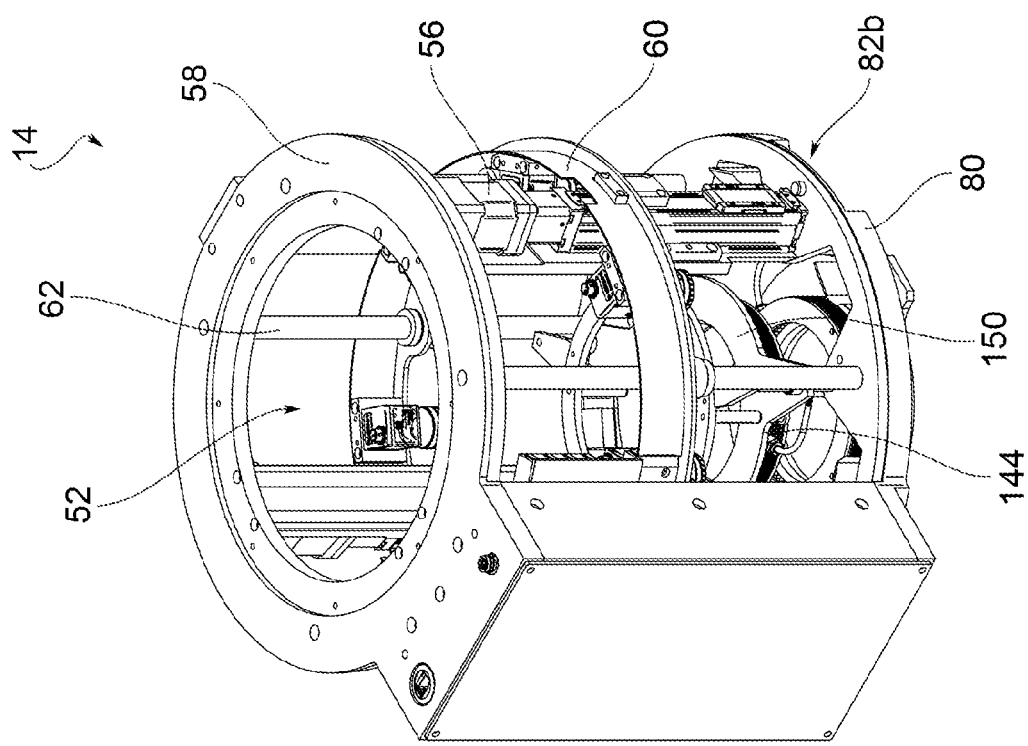
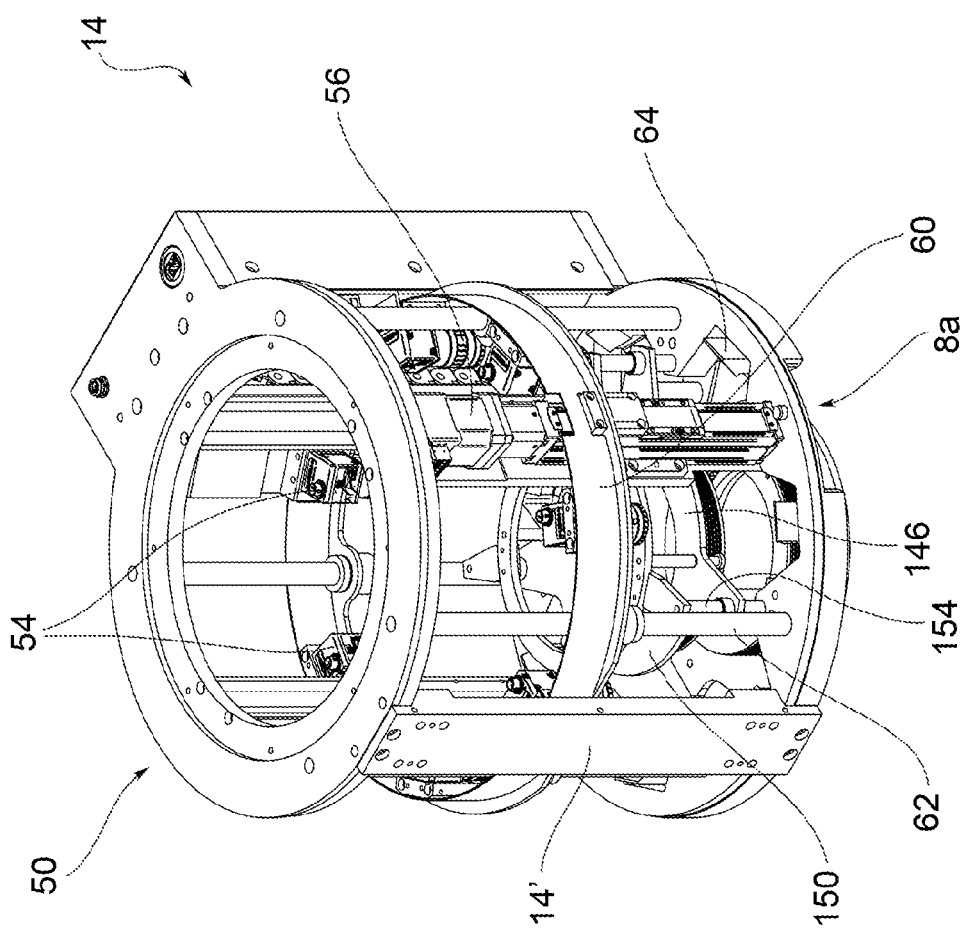
FIG.8a
FIG.8

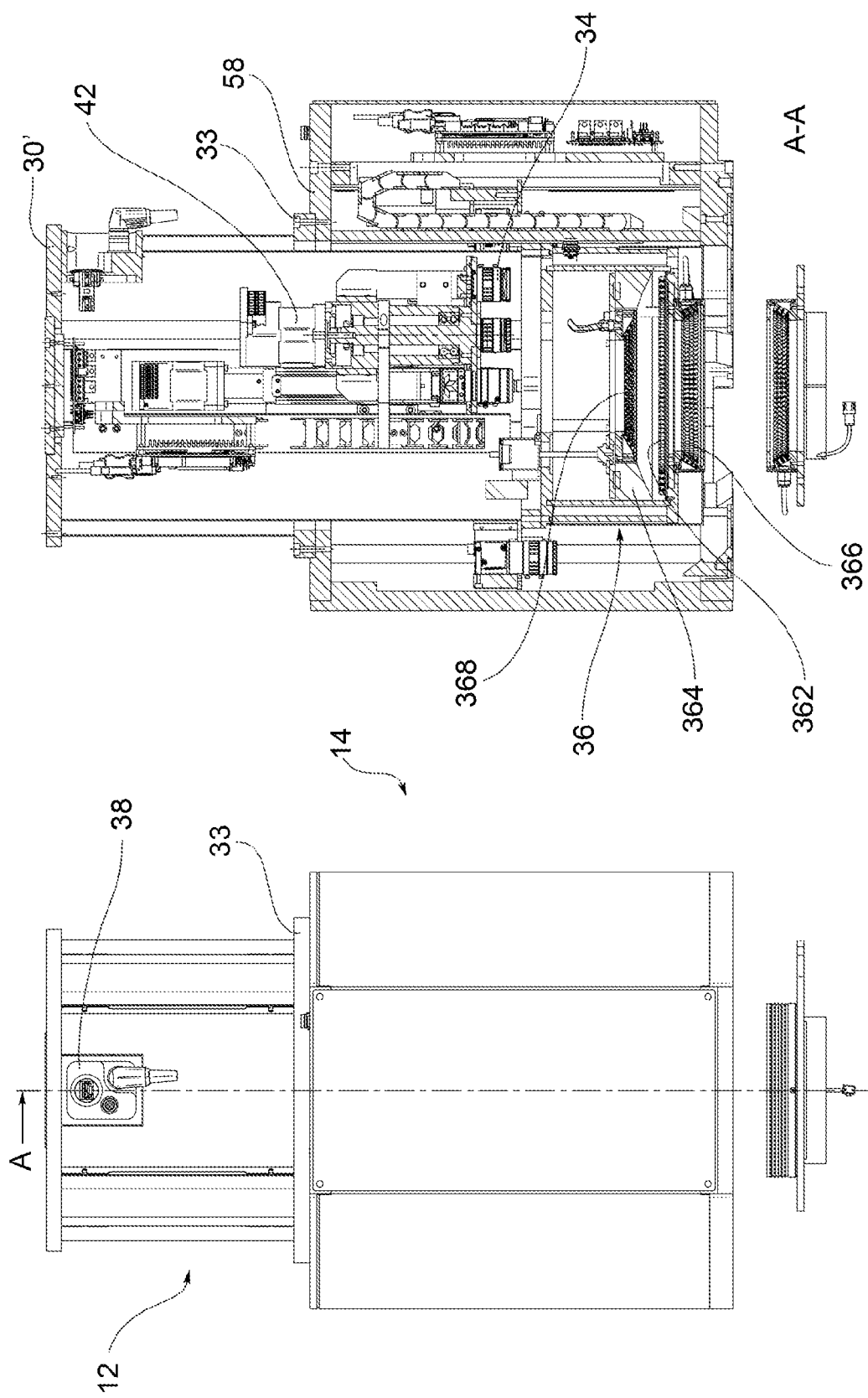

OPTICAL INSPECTION MACHINE FOR THE QUALITY CONTROL OF PARTS

CROSS-REFERENCE TO RELATED APPLICATIONS

This application is a National Phase Application of PCT International Application No. PCT/IB2020/053304, having an International Filing Date of Apr. 7, 2020 which claims priority to Italian Application No. 102019000005544 filed Apr. 10, 2019, each of which is hereby incorporated by reference in its entirety.

FIELD OF THE INVENTION

The present invention refers to an optical inspection machine for the quality control of parts, in particular gaskets.

BACKGROUND OF THE INVENTION

In a known embodiment, the machine comprises a rotary table on which the parts to be inspected are placed, and, above said rotary table, at least one surface viewing unit for inspecting the upper surface of a part, and at least one peripheral viewing unit for inspecting the outer and/or inner side surfaces of a part.

The machine furthermore comprises stations for ejecting parts from the rotary table to conveyors for compliant parts and conveyors for parts to be discarded.

The viewing units and ejection stations are positioned with an angular distance from each other on the rotary table.

The viewing units use one or more video cameras, one or more illuminators to illuminate the parts being photographed, and possibly a mirror system.

In order to acquire clear and precise images of all portions of outer and inner surfaces of a part for subsequent dimension checks, a plurality of viewing units and a high number of video cameras are used.

Obviously, using various inspection stations and a multitude of devices to acquire images has an impact on the overall size of the machine, the assembly and handling times, and the cost of the machine.

SUMMARY OF THE INVENTION

The purpose of this invention is to provide an optical inspection machine capable of combining high performance, especially in terms of the ability to acquire images of all surfaces of a part, with limited overall size and the use of a reduced number of components.

Another purpose of the invention is to provide an optical inspection machine as described above, capable of being easily and quickly adapted to the shape and/or dimensions of the part to be checked.

Said purposes are achieved with an optical inspection machine for inspecting parts, according to claim 1. The dependent claims describe preferred embodiments of the invention.

The features and advantages of the machine according to the invention will become clear from the description given below of preferred embodiments, given solely as non-limiting examples in referenced to the enclosed figures, wherein:

BRIEF DESCRIPTION OF THE DRAWINGS

FIGS. 2 and 2a are two elevation views of a surface viewing unit of the optical inspection machine;

FIGS. 8 and 8a are two perspective views of the peripheral viewing unit;

FIG. 9 is an elevation view of the inspection assembly comprising the surface viewing unit partially inserted into the peripheral viewing unit; and FIG. 10 is an axial cross-section of the inspection assembly in FIG. 9.

DETAILED DESCRIPTION

In these drawings, the label 1 refers to an optical inspection machine for the quality control of parts according to the invention, as a whole.

Machine 1 comprises a rotary table 10 on which the parts to be inspected are placed. For example, rotary table 10 is made of a transparent material such as glass.

At least one surface viewing unit 12 suitable for acquiring images primarily of the upper and/or lower surfaces of a part is positioned above and/or below rotary table 10.

At least one peripheral viewing unit 14 suitable for acquiring images primarily of the outer and/or inner side surfaces of the part is positioned above rotary table 10.

Figure 1:
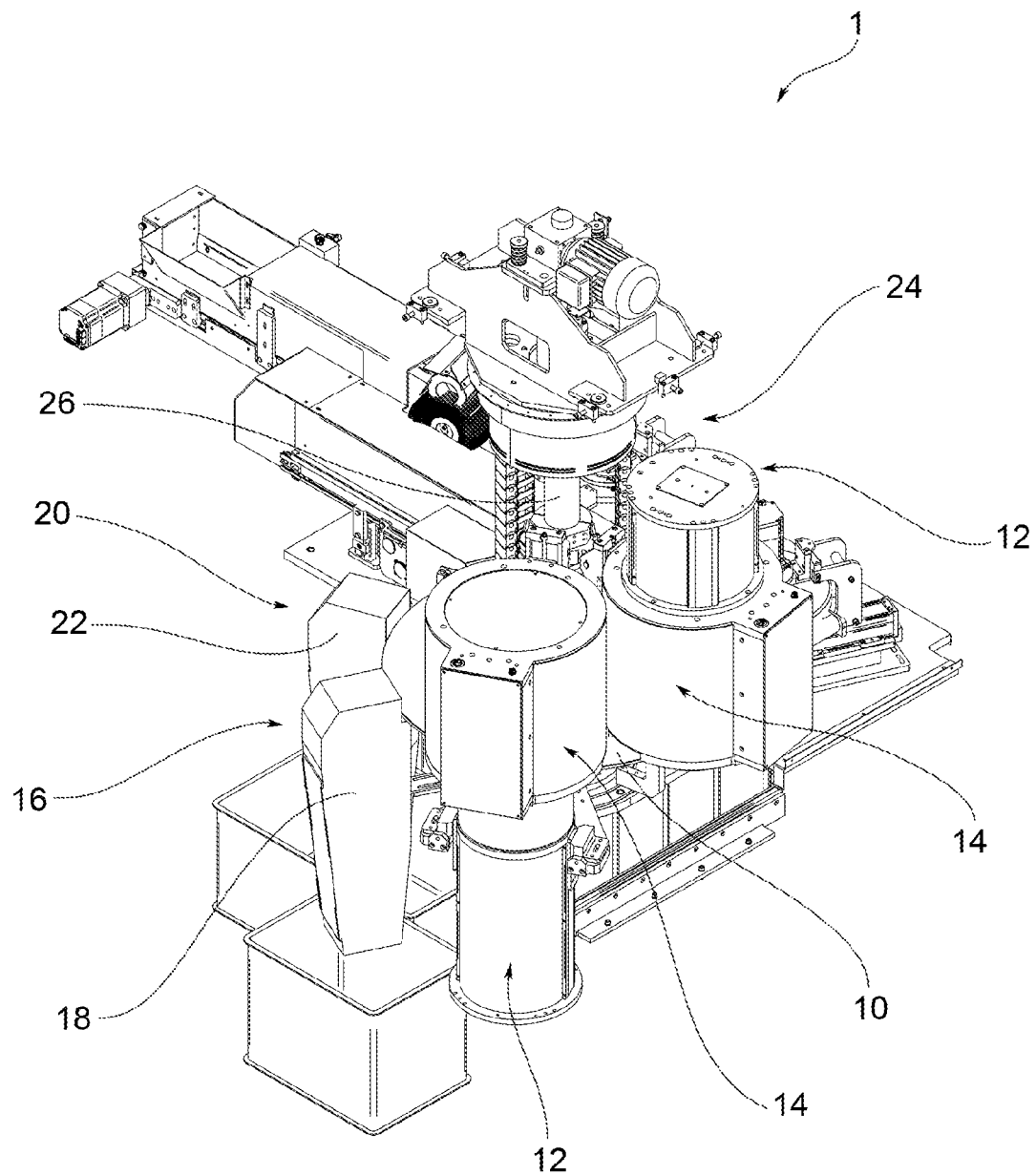
FIG. 1 is a perspective view of an embodiment of an optical inspection machine according to the invention.

As will be described below, and as is also shown in FIG. 1, a surface viewing unit 12 can also be inserted into a peripheral viewing unit 14 so as to use both units, either simultaneously or individually, in a single inspection station.

In addition, at least a first part ejection station 16, which is activatable to eject a part from rotary table 10 to a first external conveyor 18 for compliant parts, and at least a second part ejection station 20, which is activatable to eject a part from rotary table 10 to a second external conveyor 22 for rejected parts, are positioned above rotary table 10.

Viewing units 12, 14 and part ejection stations 16, are positioned with an angular distance from each other on rotary table 10.

Each viewing unit 12, 14 placed above rotary table 10 and each part ejection station 16, 20 is connected to a central mounting member 24 that is coaxial to the axis of rotary table 10 and is movable vertically in relation to rotary table 10.

For example, each surface and peripheral viewing unit 12, 14 and each part ejection station 16, 20 is provided with a corresponding lateral attachment plate 12', 14' with corresponding counter-attachment plates for central mounting member 24.

In one embodiment, this central mounting member 24 is movable vertically between a low work position and a raised rest position allowing an operator to gain access to rotary table 10 for the maintenance or replacement thereof.

In a preferred embodiment, central mounting member 24 is movable vertically, not only to allow for easy access to the rotary table for the removal thereof from the machine, but also for making a fine adjustment of the position of each viewing unit and ejection station in relation to the rotary table, for example as a function of the height of the part being inspected.

In a preferred embodiment shown in the drawings, central mounting member 24 is driven by an electric shaft 26.

In reference to FIGS. 2 and 2a, surface viewing unit 12 comprises a substantially cylindrical surface inspection frame 30 with a vertical axis, which slidably supports a viewing assembly 28 comprising at least one video camera 32 provided with at least one optical unit 34 pointing downward.

In the example shown in the drawings, frame 30 lies between an upper plate 30' and a lower plate 30". An illuminator 36 suitable for illuminating the part targeted by video camera 32 can be attached, for example, to lower plate 30".

Viewing unit 12 is provided with a first focusing drive unit 38 suitable to move the viewing assembly 28 axially along frame 30.

For example, first focusing drive unit 38 comprises two lateral motors 38' mounted on opposite sides of frame 30.

In one embodiment, viewing assembly 28 comprises a single video camera 32 and a plurality of lenses 34 having different optical properties. Lenses 34 can be used selectively with video camera 32, for example according to the shape and/or dimensions of the part to be checked.

By means of corresponding lens mounts, lenses 34 are secured in corresponding lens openings made in a peripheral area of a rotary plate 40.

Video camera 32, by means of its corresponding video camera mount, is positioned so as to pass in front of the side of the peripheral area of rotary plate 40 opposite the side from which the lenses extend.

Viewing assembly 28 is provided with a second drive unit 42 suitable to rotate the rotary plate 40 so as to have the lens openings selectively face the video camera mount so as to make the video camera mount and one of the plurality of lenses 34 coaxial to each other.

Now, in reference to FIGS. 3-8, according to one feature of the invention, peripheral viewing unit 14 comprises a substantially toroidal-shaped peripheral inspection frame 50 with a vertical axis that defines a substantially cylindrical axial cavity 52.

Peripheral inspection frame 50 slidably supports a plurality of peripheral video cameras 54 lying on a substantially horizontal video camera plane.

Frame 50 also supports at least one drive unit 56 for focusing the peripheral video cameras, suitable to move the peripheral video cameras 54 in the vertical direction. For example, given the number and arrangement of the video cameras and the difficulty in positioning a drive unit coaxially with respect to the viewing unit, two drive units 56 mounted in diametrically opposed positions opposite frame 50 are used.

According to one feature of the invention, surface viewing unit 12 is suitable to be inserted at least partially into axial cavity 52 of peripheral viewing unit 14 so that a part is inspectable by the surface viewing unit 12 and by peripheral viewing unit 14 in a same inspection position, that is, in a same inspection station.

In other words, a machine 1 according to the invention can be converted from a configuration with separate viewing units, in which surface viewing unit 12 and peripheral viewing unit 14 are spaced apart from each other by an angular distance along rotary table 10, to a configuration with integrated inspection, in which surface viewing unit 12 is detached from the central mounting member and is inserted into peripheral viewing unit 14, and vice versa.

The machine shown in FIG. 1, for example, is configured with two inspection stations: a first station, above rotary table 10, is provided with only one peripheral viewing unit 14 (while a surface viewing unit 12 is positioned beneath rotary table 10, coaxially with peripheral viewing unit 14); the second station is provided with the viewing assembly comprising a surface viewing unit 12 partially inserted into a peripheral viewing unit 14.

In greater detail, peripheral inspection frame 50 is provided with an annular top flange 58. Surface inspection frame 30 is provided with an intermediate radial flange 33 suitable to be placed on top of and secured to annular top flange 58.

It must be noted that intermediate radial flange 33, by an adjustment of the axial position or thickness thereof, can be used to determine the optimum distance between surface illuminator 36 of the surface viewing unit inserted into axial cavity 52, and the reference plane consisting of the upper side of rotary table 10 on which the part to be inspected sits.

In one embodiment shown in FIG. 10, surface illuminator 36 comprises a diffuse illumination source 362 in the shape of a circular crown suitable to generate an upwardly directed light beam, inside a diffusion chamber delimited at the top by a reflecting and diffusing concave element 364.

In one embodiment, illuminator 36 also comprises a low-angle illumination source 366 placed at the lower end of illuminator 36, suitable to generate a light beam converging downward so as to illuminate the side surfaces of a part to be inspected placed beneath the illuminator.

In one embodiment, illuminator 36 further comprises a direct illumination source 368 placed in the diffusion chamber and suitable to generate a downward-directed light beam.

In one embodiment, peripheral viewing unit 14 is provided with at least one upper peripheral illuminator 142 comprising a low-angle diffuse illumination source 144 suitable to primarily illuminate the outer and/or inner side surfaces of a part to be inspected. Upper peripheral illuminator 142 is removably connected to peripheral inspection frame 50 so as to be removed to allow space for surface illuminator 36 when surface viewing unit 12 is inserted into the peripheral viewing unit.

In addition, in one embodiment, peripheral viewing unit 14 is provided with a second peripheral illuminator 90, which also comprises a low-angle illumination source 144, suitable to be positioned beneath rotary table 10.

It must be noted that first peripheral illuminator 142 and second peripheral illuminator 90 must be placed at the same distance from the reference plane consisting of the upper surface of rotary table 10.

In one embodiment, peripheral video cameras 54 are mounted to a support ring 60 which is movable along vertical guide columns 62 and is connected operationally to focusing motor or motors 56.

According to another feature of the invention, peripheral video cameras 54 are directed downward. Peripheral inspection frame 50 supports, at the base thereof, at least one angled mirror 64 beneath each video camera 54 suitable to reflect the image of a portion of the outer and/or inner side surface of the part to be inspected.

In a preferred embodiment, peripheral inspection frame 50 supports, at the base thereof, beneath each video camera 54, a pair of angled mirrors 64a, 64b sitting side-by-side in the radial direction and with different heights in relation to the rotary table so as to reflect corresponding images of various portions of the outer and/or inner side surface of the part to be inspected.

Thanks to this crown of mirrors 64, optimum perspective images of the part, according to the geometry and/or dimensions thereof, can be obtained with a reduced number of peripheral video cameras 54 in a simple and economical way from a construction standpoint, and different perspective images can be obtained simultaneously by using pairs of mirrors or even more than two mirrors for each video camera 54.

In one embodiment, the two mirrors 64a, 64b of each pair of mirrors also have angles that differ from each other.

In one embodiment, each mirror 64 or set of mirrors 64a, 64b optically paired to a corresponding video camera is held by a corresponding block 68 extending vertically from an annular mirror-mounting plate 70 removably attached to the base of peripheral inspection frame 50.

In addition, in one embodiment, the individual blocks 68 are removably anchored to annular mirror-mounting plate 70.

In this way, by simply modifying the shape of blocks 68, it is possible to customize and adapt peripheral viewing unit 14 in a quick, simple, and economical way to the shape and/or dimensions of the part undergoing optical inspection.

In particular, to modify crown of mirrors 64 only mirror-mounting plate 70 needs to be removed, leaving the peripheral viewing unit in place on the machine.

According to another feature of the invention, upper peripheral illuminator 142 is mounted on a movable illuminator plate 146 elastically supported by a fixed part of frame 50 so as to normally be kept in a lower end-of-travel position, i.e. a minimum distance from the reference plane consisting of the upper surface of rotary table 10, and engageable with a spacing member 148 causing it to move linearly upward for an adjustment of the distance of the illuminator from said reference plane, depending on the shape and/or color and/or dimensions of the part to be inspected.

Figure 4:
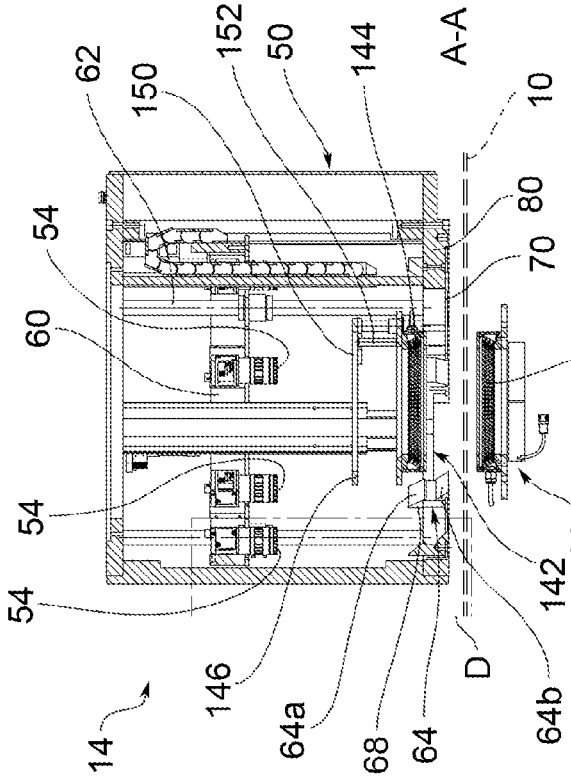
FIG. 4 is an axial cross-section along line A-A of the viewing unit in FIG. 3.
Figure 7:
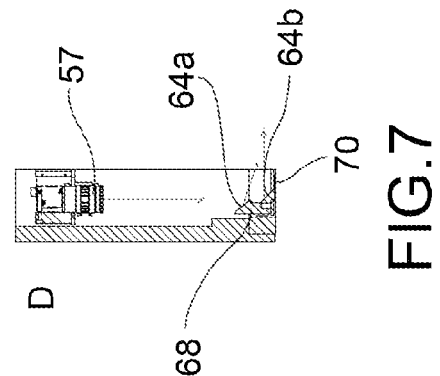
FIG. 7 is an enlarged view of detail D in FIG. 4.
Figure 6:
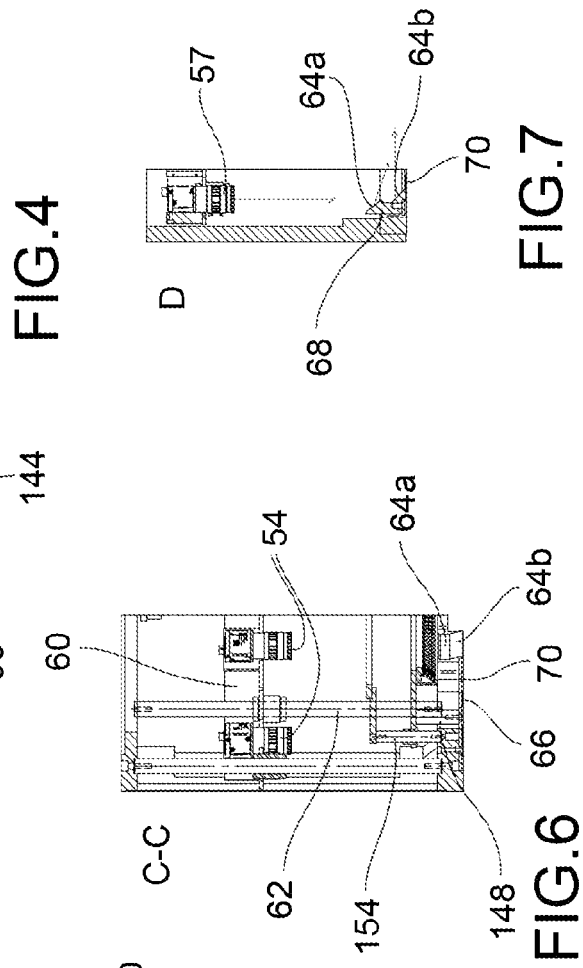
FIG. 6 is a vertical cross-section along line C-C of the viewing unit in FIG. 5.
Figure 3:
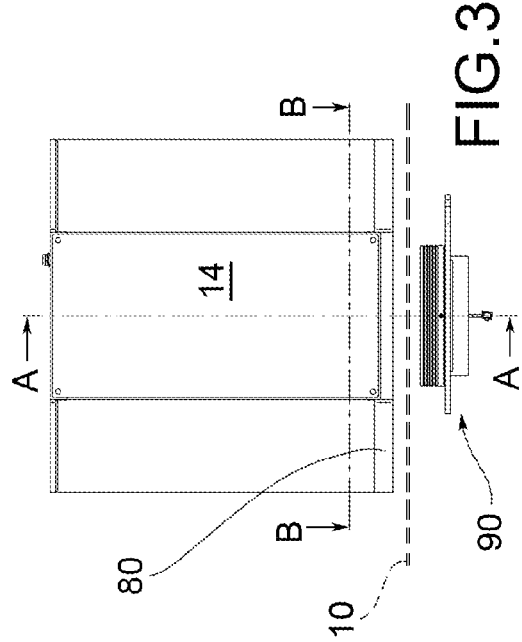
FIG. 3 is an elevation view of a peripheral viewing unit of the optical inspection machine.

In one embodiment, movable illuminator plate 146 is held by an overlying fixed illuminator plate 150, to which it is connected by means of a system of springs 152 and in relation to which is movable linearly in a guided fashion, for example by sliding along illuminator guide pins 154 (see FIGS. 4 and 6).

In one embodiment, spacing member 148, consisting, for example, of one or more pins, extends from the same annular mirror-mounting plate 70. In this way, when this annular mirror-mounting plate 70 is mounted to the base of frame 50, upper peripheral illuminator 142 is simultaneously pushed upward into the preset position determined by the height of spacing member 148. Illuminator 142 therefore does not impede installation of the crown of mirrors and does not require any other actions to adjust its position.

It must be noted that, when peripheral viewing unit 14 is used in combination with a surface viewing unit 12 installed beneath rotary plate 10, and if surface viewing unit 12 requires a backlighting source, the source can be installed on movable illuminator plate 146, for example on its upper surface opposite the side holding upper peripheral illuminator 142.

In one embodiment, peripheral inspection frame 50 is provided with a lower annular plate 80 that forms the base of the frame and that passes in front of rotary table 10 when peripheral viewing unit 14 is mounted on machine 1.

This lower annular plate 80 is broken circumferentially by an inlet opening 82a and by an outlet opening 82b (see in particular FIGS. 8 and 8a), suitable to allow a part to be inspected to pass through frame 50 after rotary table 10 rotates.

In greater detail, the peripheral edge of rotary table 10 intersects the base of frame 50 in such a way that a part to be inspected, positioned radially on rotary table 10 between the peripheral edge and the midpoint of the radius of the rotary table, passes substantially through the center of the base of frame 50.

According to another feature of the invention, peripheral video cameras 54, and consequently corresponding sets of mirrors 64, are positioned at the vertices of a regular heptagon.

Indeed, this configuration of peripheral viewing unit 14 has proven to be the best compromise between the need to limit the overall size of machine 1 and the quality of the optical inspection in terms of the number and resolution of the part's images.

Figure 5:
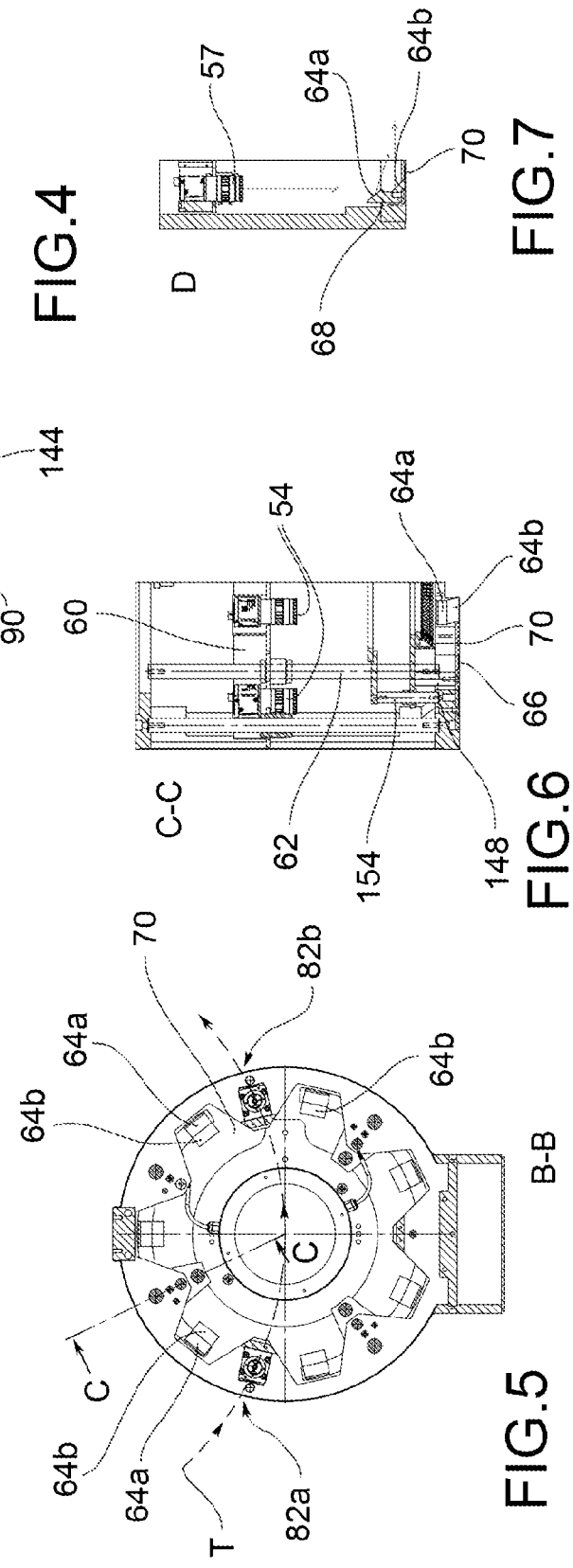
FIG. 5 is a transversal cross-section along line B-B of the viewing unit in FIG. 3.

Indeed, as can be seen in particular from the plan view of FIG. 5, trajectory T of the part placed on the rotary table which passes through peripheral viewing unit 14, which is an arc of circumference that must pass through the center of the viewing unit, substantially passes through the midpoint of the heptagon's side. Inlet and outlet openings 82a and 82b can then be sufficiently wide to allow parts of greatly differing sizes to pass through.

If the configuration were octagonal, for instance, in order to maintain the same width of the inlet and outlet openings, the viewing unit would have to be positioned radially in a more outer position than in the heptagonal configuration, or the distance between mirrors, that is, the sides of the polygon, would have to be increased considerably.

In both cases, the octagonal configuration would result in a significant increase in the overall size of the machine.

Similarly, a hexagonal configuration would comprise a smaller number of video cameras and mirrors, and therefore poorer definition. In particular, since the viewing cones of the peripheral video cameras must cover the entire side surface of the part, preferably with partial overlap between them, the use of six video cameras would limit the maximum size of the part to be inspected, thus limiting the usage versatility of the machine.

As an example, if, with six video cameras, the largest part that is insertable into the machine has a maximum diameter of approximately 68 mm, with seven video cameras, parts with a diameter of up to 85 mm can be inspected; with eight video cameras, in order to insert a part having a maximum diameter of 85 mm into the peripheral viewing unit, the size of the machine and the peripheral viewing unit would have to be increased considerably.

In order to satisfy contingent requirements, a person skilled in the art could make modifications, adaptations, and substitutions of parts with functionally equivalent ones to the embodiments of the machine according to the invention, without exceeding the scope of the following claims. Each feature described as belonging to a possible embodiment may be implemented independently of the other described embodiments.

The invention claimed is:

1. An optical inspection machine for the quality control of parts, in particular gaskets, comprising a rotary table on which the parts to be inspected are positioned and, above said rotary table, a peripheral viewing unit suitable for inspecting the outer and/or inner side surfaces of a part, wherein the peripheral inspection unit comprises a substantially toroidal peripheral inspection frame with a vertical axis that slidably supports a plurality of peripheral video cameras resting on a substantially horizontal video camera plane, a peripheral-video-camera-focusing drive unit suitable for moving the video cameras in the vertical direction, and an upper peripheral illuminator for illuminating a part to be inspected placed on the rotary table coaxially with the frame, wherein the peripheral video cameras are pointed downward and wherein the peripheral inspection frame holds at its base and beneath each video camera at least one angled mirror suitable for reflecting the image of a portion of the outer and/or inner side surface of the part to be inspected; and wherein the peripheral inspection frame supports, at the base thereof, beneath each video camera, a pair of angled mirrors sitting side-by-side in the radial direction and with different heights in relation to the rotary table so as to reflect corresponding images of various portions of the outer and/or inner side surface of the part to be inspected.

2. A machine according to claim 1, wherein the two mirrors of each pair of mirrors are also at different angles with respect to each other.

3. A machine according to claim 1, wherein an annular mirror-mounting plate is secured to the base of the frame and wherein each mirror or pair of mirrors is held by a corresponding block that extends vertically from the annular mirror-mounting plate.

4. A machine according to claim 3, wherein said annular mirror-mounting plate is removably connected to the frame.

5. A machine according to claim 3, wherein each block is removably connected to the annular mirror-mounting plate.

6. A machine according to claim 1, wherein there are seven peripheral video cameras and they are positioned at the vertices of a regular heptagon.

7. A machine according to claim 1, wherein the peripheral video cameras are secured to a mounting ring which is movable along vertical guide columns and is connected operationally to the focusing motor.

8. A machine according to claim 1, wherein the upper peripheral illuminator is mounted on a movable illuminator plate elastically supported by a fixed part of the peripheral inspection frame so as to normally be held in a lower end-of-travel position and is engageable with a spacing member causing it to move linearly upward to adjust the distance between the illuminator and the reference plane consisting of the upper surface of the rotary table, depending on the shape and/or color and/or dimensions of the part to be inspected.

9. A machine according to claim 8, wherein an annular mirror-mounting plate is secured to the base of the frame, wherein each mirror or pair of mirrors is held by a corresponding block that extends vertically from the annular mirror-mounting plate, and wherein the movable illuminator plate is held by an overlying fixed illuminator plate, to which said plate is connected by means of a system of springs and in relation to which said plate is movable linearly in a guided fashion, for example by sliding along illuminator guide pins.

10. A machine according to claim 8, wherein said spacing member extends from the annular mirror-mounting plate.

11. A machine according to claim 1, furthermore comprising a surface viewing unit suitable for inspecting the upper surface of a part and comprising a substantially cylindrical surface inspection frame with a vertical axis that slidably supports at least one video camera provided with at least one downward-pointing optical unit, at least one focusing drive unit suitable for moving the video camera in the vertical direction, and, at the base of said frame, a surface illuminator suitable for illuminating the part to be inspected and comprising a low-angle illumination source, wherein the frame of the peripheral viewing unit defines an internal axial cavity suitable for at least partially housing said surface viewing unit, and wherein the upper peripheral illuminator is removably connected to the peripheral viewing frame so as to be replaced by the peripheral surface illuminator.

12. A machine according to claim 11, wherein the peripheral viewing unit frame is provided with an annular top flange, and wherein the surface viewing unit frame is provided with an intermediate radial flange suitable to be placed on top of and secured to the annular top flange.

* * * * *